US012676684B2

(12) United States Patent
Gan et al.

(10) Patent No.: US 12,676,684 B2
(45) Date of Patent: Jul. 7, 2026

(54) SYSTEMS AND METHODS FOR DETECTING RELOCATION OF A WIRELESS ACCESS POINT

(71) Applicant: Verizon Patent and Licensing Inc., Basking Ridge, NJ (US)

(72) Inventors: Seng Gan, Ashburn, VA (US); Andrew F. Patka, Holliston, MA (US); Michael D. Hanson, Millington, NJ (US); Sankar Subramanian, Ossining, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 541 days.

(21) Appl. No.: 18/296,365

(22) Filed: Apr. 5, 2023

(65) Prior Publication Data

US 2024/0340095 A1 Oct. 10, 2024

(51) Int. Cl.
*H04B 17/27* (2015.01)
*H04B 17/318* (2015.01)

(52) U.S. Cl.
CPC ........... *H04B 17/27* (2015.01); *H04B 17/318* (2015.01)

(58) Field of Classification Search
None
See application file for complete search history.

(56) References Cited

U.S. PATENT DOCUMENTS

| | | | |
|---|---|---|---|
| 10,064,159 B1 * | 8/2018 | Sung | G01S 5/01 |
| 12,457,260 B2 * | 10/2025 | Peterson | H04L 65/60 |
| 2016/0037424 A1 * | 2/2016 | Xie | H04W 48/16 370/329 |
| 2021/0368287 A1 * | 11/2021 | Chen | G07C 9/28 |

* cited by examiner

*Primary Examiner* — Adolf Dsouza

(57) ABSTRACT

A management system may analyze signal strengths of signals received, from a plurality of devices, by a first device located in a first location of an enclosed structure. The management system may determine, based on analyzing the signal strengths, that a first subset of devices are located outside of the enclosed structure and that a second subset of devices are located inside of the structure. The second subset of devices include a second device and a third device that are stationary. The management system may determine that the first signal strength, of the second device, has increased by an attenuation value and that the second signal strength, of the third device, has decreased by the attenuation value. The management system may determine that the first device has been relocated based on the first signal strength increasing by the attenuation value and the second signal strength decreasing by the attenuation value.

20 Claims, 11 Drawing Sheets

100

140
Determine whether a median value of a signal strength of a first Wi-Fi device satisfies a signal strength threshold

145
Determine whether a difference between a maximum value and a minimum value of the signal strength of the first Wi-Fi device exceeds a particular value that is based on the attenuation value and a quantity of obstructing structures Management system
115

150
Determine whether the first Wi-Fi device is located inside the building or located outside the building

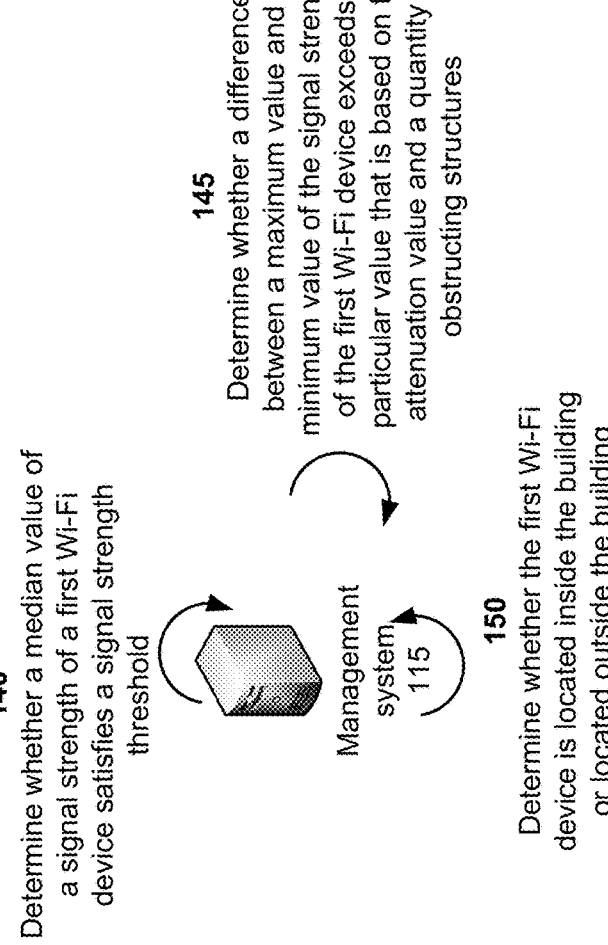

FIG. 1C

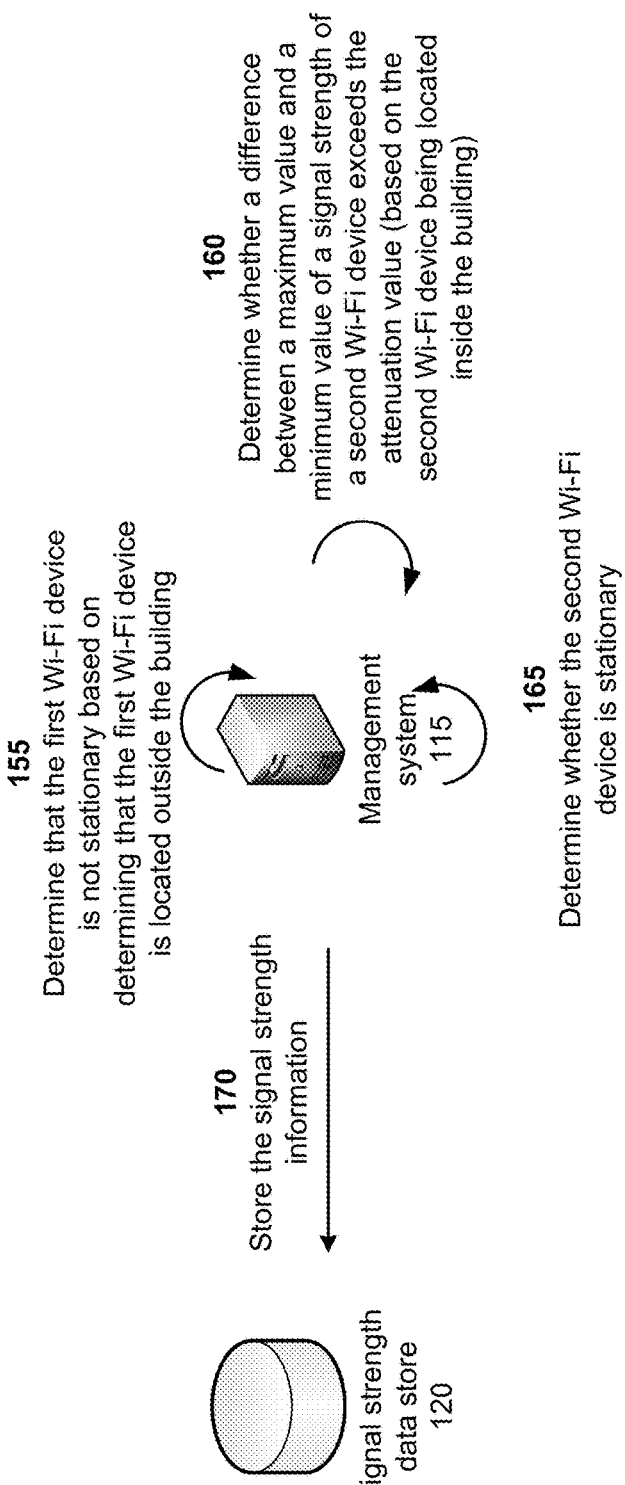

155
Determine that the first Wi-Fi device is not stationary based on determining that the first Wi-Fi device is located outside the building

160
Determine whether a difference between a maximum value and a minimum value of a signal strength of a second Wi-Fi device exceeds the attenuation value (based on the second Wi-Fi device being located inside the building)

165
Determine whether the second Wi-Fi device is stationary

Management system 115

170
Store the signal strength information

Signal strength data store 120

Management system 115

175

Determine that a network connectivity of the WAP device has been degraded

Figure 1G:
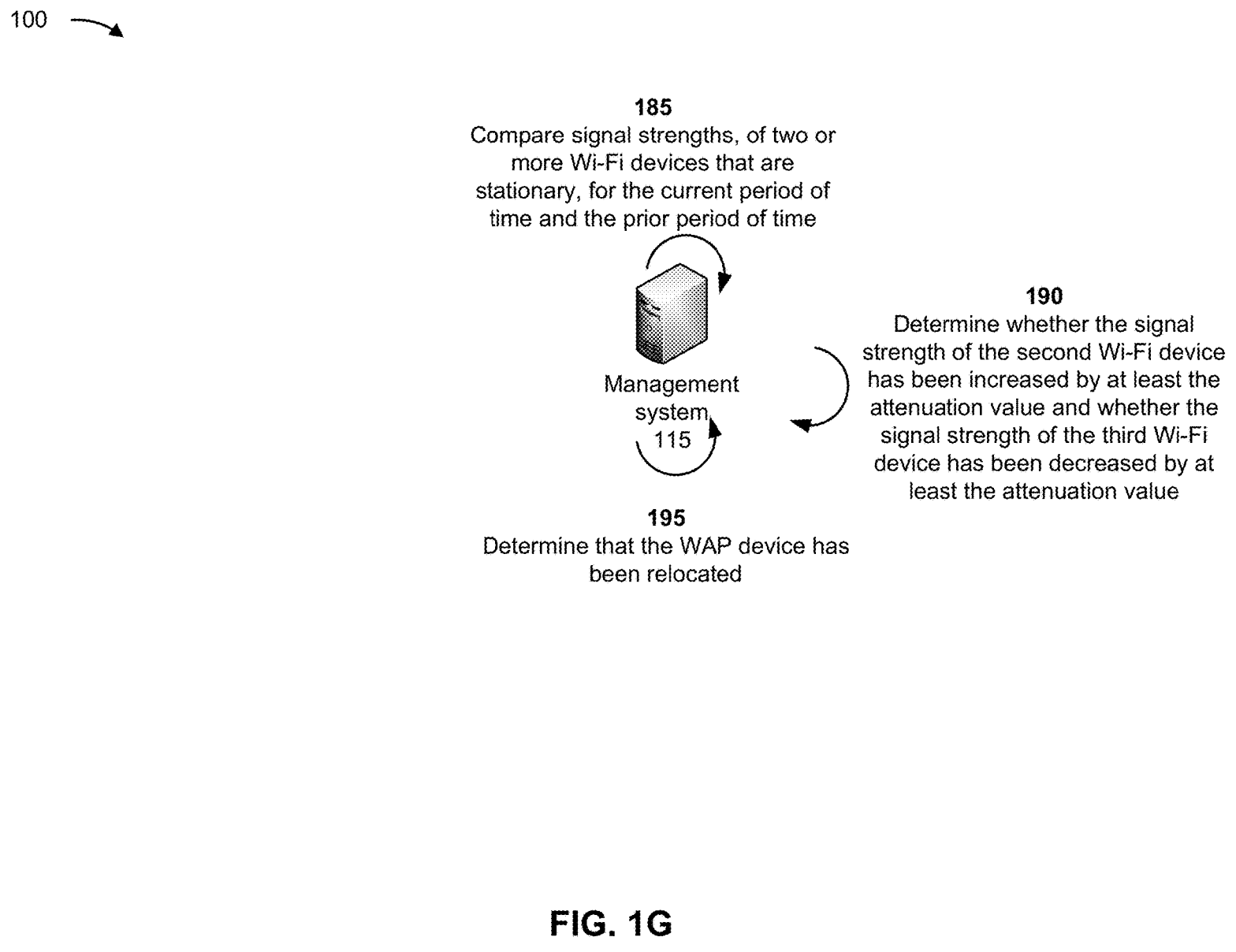

190

Determine whether the signal strength of the second Wi-Fi device has been increased by at least the attenuation value and whether the signal strength of the third Wi-Fi device has been decreased by at least the attenuation value

185

Compare signal strengths, of two or more Wi-Fi devices that are stationary, for the current period of time and the prior period of time Management system 115

195

Determine that the WAP device has been relocated

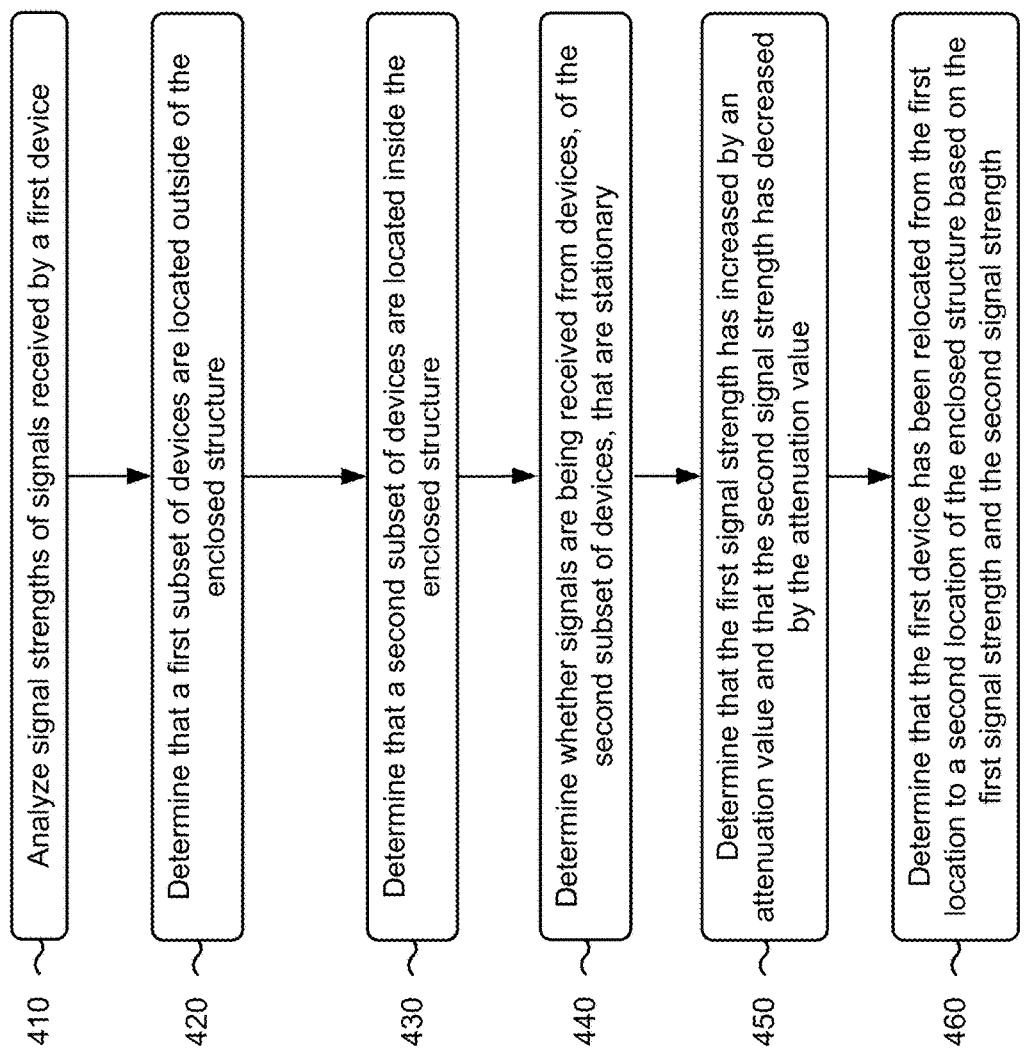

400

410   Analyze signal strengths of signals received by a first device

420   Determine that a first subset of devices are located outside of the enclosed structure 430   Determine that a second subset of devices are located inside the enclosed structure 440   Determine whether signals are being received from devices, of the second subset of devices, that are stationary 450   Determine that the first signal strength has increased by an attenuation value and that the second signal strength has decreased by the attenuation value 460   Determine that the first device has been relocated from the first location to a second location of the enclosed structure based on the first signal strength and the second signal strength

FIG. 4

SYSTEMS AND METHODS FOR DETECTING RELOCATION OF A WIRELESS ACCESS POINT

BACKGROUND

A wireless access point may provide network connectivity to multiple devices connected to the wireless access point. The wireless access point may communicate with the devices using the Institute of Electrical and Electronics Engineers (IEEE) 802.11 family of standards. For example, the wireless access point may enable the devices to receive information and/or transmit information to a network using Wi-Fi signals.

BRIEF DESCRIPTION OF THE DRAWINGS

FIGS. 1A-1H are diagrams of an example associated with detecting the relocation of a wireless access point.

FIG. 4 is a flowchart of an example process relating to detecting the relocation of a wireless access point.

DETAILED DESCRIPTION OF PREFERRED EMBODIMENTS

Figure 1A:
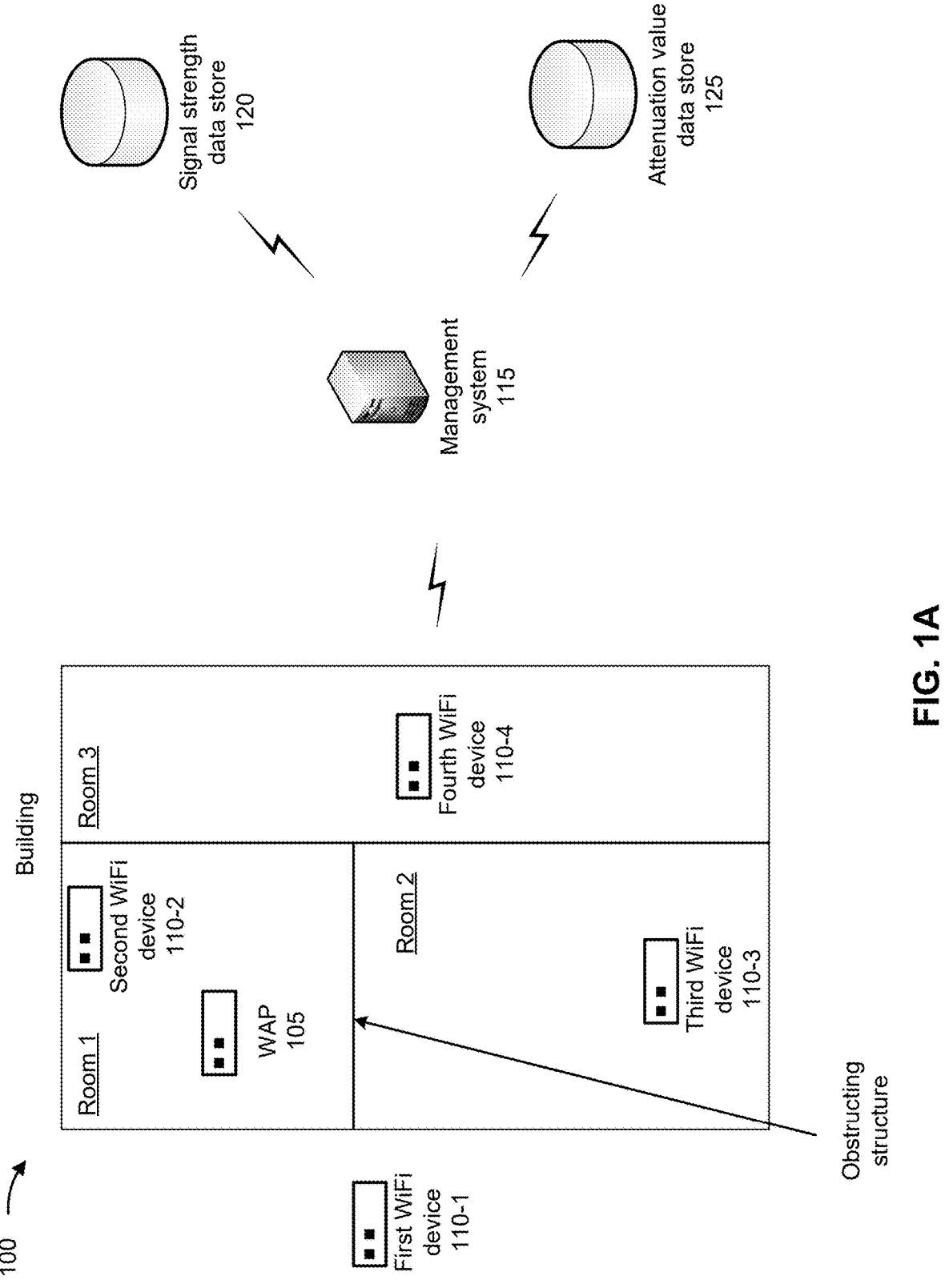

The following detailed description of example implementations refers to the accompanying drawings. The same reference numbers in different drawings may identify the same or similar elements.

A wireless access point (WAP) may establish a connection to multiple Wi-Fi devices. The WAP may enable the Wi-Fi devices to communicate with network devices of a network. For example, the WAP may enable the Wi-Fi devices to receive information from and transmit information to the network devices of a network.

A "Wi-Fi device" as used herein may refer to a device that is configured to operate in accordance with Wi-Fi wireless network protocols (e.g., based on the IEEE 802.11 family of standards). In some examples, the Wi-Fi device may be configured to receive Wi-Fi signals from the network devices via the WAP, process the Wi-Fi signals, and transmit Wi-Fi signals to the network devices (e.g., via the WAP).

In some situations, a network connectivity of the WAP may be degraded. For example, a quality of the connection may be degraded, which may cause a delay with respect to the Wi-Fi devices receiving information from and transmitting information to the network devices. In some instances, the degraded network connectivity may prevent the Wi-Fi devices from receiving and/or transmitting information.

As a result of the network connectivity being degraded, a user (associated with the WAP) may use one or more computing devices to troubleshoot the connection and/or the WAP device to determine possible reasons of the degraded network connectivity. Additionally, or alternatively, the user may provide a notification to a service provider that provide network services to the user. The notification may indicate the network connectivity has been degraded. As a result, personnel of the service provider may use one or more computing devices to troubleshoot the connection and/or the WAP device to determine possible reasons of the degraded network connectivity.

The degraded network connectivity may be caused by different reasons. The one or more computing devices may be used to troubleshoot the connection and/or the WAP to determine whether each of the different reasons has occurred. Troubleshooting the connection in this manner is a time-consuming process. Accordingly, troubleshooting the connection may excessively consume network resources and/or computing resources, among other resources. In some examples, as a result of troubleshooting the connection, the WAP and the Wi-Fi devices may reboot and/or perform a re-configuration multiple times. Rebooting and/or performing the re-configuration in this manner may excessively consume network resources and/or computing resources, among other resources.

Implementations described herein are directed to determining a cause of a performance of a WAP being degraded (e.g., directed to determining a cause of a degradation of a quality of a connection established by the WAP). For example, as part of troubleshooting the connection, a management system may detect whether the WAP has been moved significantly enough to degrade the performance of the WAP. For instance, the management system may use signal strengths, of signals received from Wi-Fi devices that are stationary, to whether the WAP has been moved significantly enough to degrade the performance of the WAP.

In some implementations, the management system may obtain signal strength information from the WAP. The signal strength information relates to the strength of the signals received by the WAP. The signals may be received from Wi-Fi devices connected to the WAP. In some situations, the WAP may be provided in a room of customer premises.

Based on the signal strength information, the management system may identify a first set of Wi-Fi devices that are located outside of the customer premises. For example, the management system may determine that a median value (or an average value) of the signal strengths, of the signals received from a Wi-Fi device, does not satisfy a signal strength threshold. Accordingly, the management system may determine that the Wi-Fi device is located outside of the customer premises.

In some situations, the median value (or the average value) of the signal strengths may satisfy the signal strength threshold. In such situations, the management system may determine the difference between the maximum value of the signal strengths and the minimum value of the signal strengths. The management system may determine that the Wi-Fi device is located outside of the customer premises if the difference exceeds a particular value that is based on a quantity of obstructing structures (e.g., walls) and an attenuation value. The quantity of obstructing structures may be a quantity of obstructing structures included in the customer premises.

An attenuation value may refer to a value by which a signal strength is increased or decreased due an obstructing structure. In some implementations, the attenuation value may be associated with a frequency band of a signal. For example, the attenuation value may indicate a measure of signal attenuation caused by the obstructing structure to signals of the frequency band. In some examples, personnel of a service provider (associated with the WAP) may determine the attenuation value. For example, during installation of the WAP, the personnel may measure a value by which the signal strength of the signal of the frequency band is increased or decreased by the obstructing structure. Due to standard building codes in a particular country/region, a standard estimated attenuation value for each frequency can be used in the event no actual measurement is available.

Additionally, based on the signal strength information, the management system may identify a second set of Wi-Fi devices that are located inside of the customer premises. For example, the management system may determine that a median value (or an average value) of the signal strengths, of the signals received from a Wi-Fi device, satisfies the signal strength threshold. Additionally, the management system may determine that the difference does not exceed the particular value. Accordingly, the management system may determine that the Wi-Fi device is located inside of the customer premises.

In some implementations, the network management may identify Wi-Fi devices that are stationary. In other words, the network management may identify Wi-Fi devices that are not typically moved from one location to another location of the customer premises. For example, the Wi-Fi devices that are stationary may be devices mounted to a wall. The management system may identify the Wi-Fi devices that are stationary as reference points for the WAP. For example, the management system may analyze changes to the signal strengths of the signals received from such Wi-Fi devices to determine whether the WAP has been moved.

When identifying a Wi-Fi device that is stationary, the management system may determine that the difference (between the maximum value of the signal strengths and the minimum value of the signal strengths) does not exceed the attenuation value.

In some implementations, the management system may analyze the signal strengths of the signals received from two or more Wi-Fi devices that are stationary. The management system may analyze the signal strengths to determine changes to the signal strengths over different periods of time. For example, the management system may determine whether a first signal strength, of signals received from a first Wi-Fi device that is stationary, has increased by a value that exceeds the attenuation value. Additionally, the management system may determine whether a second signal strength, of signals received from a second Wi-Fi device that is stationary, has decreased by a value that exceeds the attenuation value.

By determining that the first signal strength has increased by a value that exceeds the attenuation value and determining that the second signal strength has decreased by a value that exceeds the attenuation value, the management system may determine that the WAP has been relocated from a current location to a different location (e.g., a different room on customer premises). In this regard, the management system may determine that the WAP being relocated is a cause of the performance of the WAP being degraded.

By determining that the WAP being relocated is a cause of the degraded performance, the management system may prevent time-consuming troubleshooting, as described above. Accordingly, by determining that the WAP being relocated is the cause of the degraded performance, the management system may prevent the WAP and the Wi-Fi devices from rebooting and/or performing the re-configuration, as described above. Therefore, implementations described herein preserve network resources and/or computing resources that would have been consumed by troubleshooting the connection, as described above.

While examples described herein are directed to determining a cause of a performance of a WAP being degraded, implementations described herein are applicable to determining a cause of a performance of a Wi-Fi device being degraded in a similar manner (e.g., directed to determining a cause of a degradation of a quality of a connection established by the Wi-Fi device).

FIGS. 1A-1H are diagrams of an example 100 associated with detecting the relocation of a wireless access point. As shown in FIGS. 1A-1H, example 100 includes a WAP 105, a first Wi-Fi device 110-1, a second Wi-Fi device 110-2, a third Wi-Fi device 110-3, a fourth Wi-Fi device 110-4, a management system 115, a signal strength data store 120, and an attenuation value data store 125. First Wi-Fi device 110-1, second Wi-Fi device 110-2, third Wi-Fi device 110-3, and fourth Wi-Fi device 110-4 may be collectively referred to as "Wi-Fi devices 110" and individually referred to as "Wi-Fi device 110."

WAP 105 may include a communication device and a computing device. For example, WAP 105 may include a router, a transceiver, and/or a customer premises equipment (CPE), among other examples. WAP 105 may be configured to establish a connection with Wi-Fi devices 110 to enable Wi-Fi devices 110 to transmit and receive information using Wi-Fi signals. As shown in FIG. 1A, WAP 105 may be located in a first location of an enclosed structure. For example, WAP 105 may be located in a first room of a building.

Wi-Fi devices 110 may include communication devices and computing devices. For example, Wi-Fi devices 110 may include a mobile phone, a user equipment, a laptop computer, a tablet computer, a camera, a television (e.g., a smart TV), a doorbell, a desktop computer, a WAP, and/or a fixed wireless access device configured to transmit and receive Wi-Fi signals, among other examples. As shown in FIG. 1A, first Wi-Fi device 110-1 may be located outside of the building while second Wi-Fi device 110-2, third Wi-Fi device 110-3, and fourth Wi-Fi device 110-4 may be located inside of the building. For example, second Wi-Fi device 110-2 may be located in the first room of the building, third Wi-Fi device 110-3 may be located in a second room of the building, and fourth Wi-Fi device 110-4 may be located in a third room of the building.

Management system 115 may include one or more devices configured to detect a relocation of WAP 105. For example, management system 115 may analyze signal strengths of signals received by WAP 105 from Wi-Fi devices 110. Management system 115 may analyze the signal strengths to determine changes to the signal strengths over a period of time. Based on the changes, management system 115 may determine that WAP 105 has been relocated, as explained in more detail below.

Signal strength data store 120 may include a database or the like in a data structure, e.g., a table, and/or a linked list or the like, that stores signal strength information regarding values of signal strengths of signals received by WAP 105. The signals may be received from Wi-Fi devices 110. In some examples, the signal strengths may be measured by WAP 105. The signal strength information may be stored in signal strength data store 120 by WAP 105.

In some situations, the signal strength information may include information indicating whether a Wi-Fi device is a stationary or whether the Wi-Fi device is not stationary (e.g., a device that is mobile). Additionally, or alternatively, the signal strength information may include information indicating whether the Wi-Fi device is located inside of the building or is located outside of the building. In some implementations, management system 115 may determine whether the Wi-Fi device is stationary and/or whether the Wi-Fi device is located inside of the building based on the signal strength of the signals received from the Wi-Fi device.

Attenuation value data store 125 may include a database or the like in a data structure, e.g., a table, and/or a linked list or the like, that stores attenuation information regarding attenuation values associated with signal strengths of signals received by WAP 105. An attenuation value may refer to a value by which a signal strength is increased or decreased due an obstructing structure (e.g., a wall).

Attenuation value data store 125 may store attenuation information associated with different geographic addresses. A geographic address may include geographical coordinates, a zip code, a street number, and/or a street name, among other examples. As an example, attenuation value data store 125 may store first attenuation information regarding a first geographic address, second attenuation information regarding a second geographic address, and so on.

For instance, WAP 105 may be located at a customer premises (e.g., the building) and the first attenuation information may be associated with an address of the customer premises. The address may include geographical coordinates of the customer premises, a zip code of the customer premises, a street number of the customer premises, and/or a street name of the customer premises, among other examples.

In some implementations, the first attenuation information may include one or more attenuation values associated with one or more frequency bands. For example, the first attenuation information may include a first attenuation value associated with a first frequency band, a second attenuation value associated with a second frequency band, and so on. In some examples, personnel of a service provider (associated with WAP 105) may determine the one or more attenuation values. For example, during installation of WAP 105, the personnel may measure an amount of interference caused by obstructing structures (at the customer premises) to signals of different frequency bands. For instance, by way of measurements, the personnel may determine that the obstructing structures decrease a signal strength of signals of a first frequency band by a first attenuation value, determine that the obstructing structures decrease a signal strength of signals of a second frequency band by a second attenuation value, and so on. In some examples, the personnel may estimate the one or more attenuation values based on similar measurements obtained at a location within a distance threshold of the customer premises.

Figure 1B:
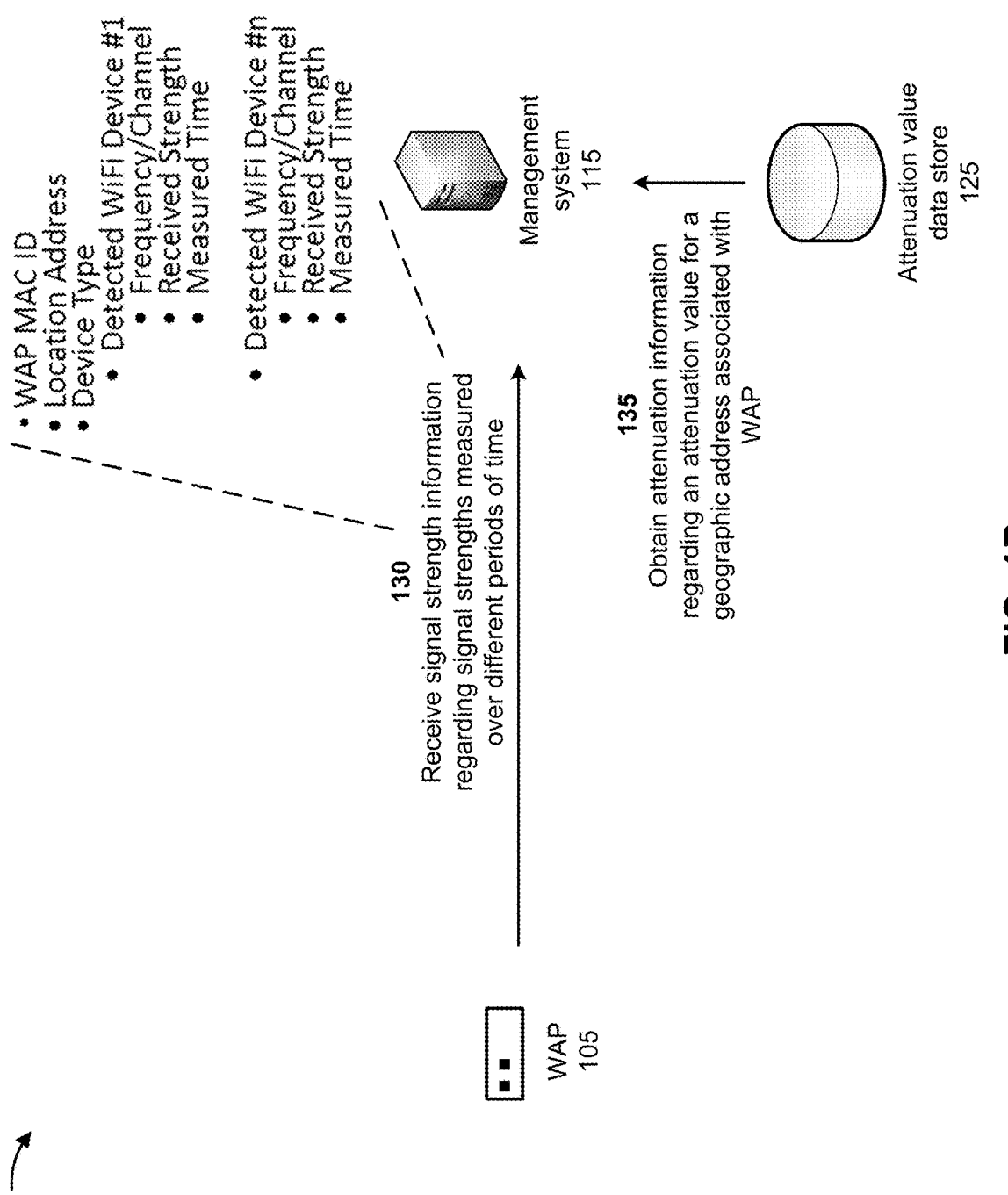

As shown in FIG. 1B, and by reference number 130, management system 115 may receive signal strength information regarding signal strengths measured over different periods of time. For example, WAP 105 may measure the signal strengths and provide the signal strength information (regarding the measured signal strengths) to management system 115. In some instances, when measuring a signal strength, WAP 105 may determine a reference signal received power (RSRP) measurement, a channel quality indicator (CQI) measurement, a signal to interference plus noise ratio (SINR) measurement, and/or a reference signal received quality (RSRQ) measurement.

In some implementations, management system 115 may receive the signal strength information from WAP 105. In some implementations, management system 115 may receive the signal strength information based on a trigger (e.g., based on a request from management system 115). Additionally, or alternatively, management system 115 may receive the signal strength information periodically (e.g., every millisecond, every 10 milliseconds, every 30 milliseconds, among other examples).

As shown in FIG. 1B, for example, the signal strength information may include information identifying WAP 105, information identifying an address associated with WAP 105, information identifying a type of WAP 105, information identifying one or more Wi-Fi devices 110 associated with WAP 105, a signal strength of signals received from each Wi-Fi device, a frequency of the signals received from each Wi-Fi device, information identifying a frequency band (or a channel) of the signals received by WAP 105, and/or information identifying a time or a period of time during which the signal strengths were measured, among other examples.

The information identifying WAP 105 may include a mobile directory number (MDN) of WAP 105, a serial number of WAP 105, and/or a network address associated with WAP 105, such as a media access control address associated with WAP 105, among other examples. The information identifying the address associated with WAP 105 may include information identifying the address of the customer premises (e.g., geographical coordinates, a zip code, a street number, and/or a street name, among other examples).

The information identifying the type of WAP 105 may include information identifying a type of frequency supported by WAP 105. The information identifying a Wi-Fi device may include the MDN of the Wi-Fi device, a serial number of the Wi-Fi device, and/or a network address associated with the Wi-Fi device, among other examples.

When receiving the signal strength information, management system 115 may receive first signal strength information regarding signal strengths of signals received from first Wi-Fi device 110-1, receive second signal strength information regarding signal strengths of signals received from second Wi-Fi device 110-2, and so on. As an example, the first signal strength information may include information identifying a frequency band (or a channel) of signals received by WAP 105 from first Wi-Fi device 110-1, information identifying first Wi-Fi device 110-1, information identifying signal strengths of the signals, and/or information identifying a time or a period of time during which the signal strengths were measured, among other examples.

In some implementations, management system 115 may store the signal strength information in signal strength data store 120. In some implementations, management system 115 may store a different entry for each Wi-Fi device 110. For example, management system 115 may store (in a first entry) the signal strength information for first Wi-Fi device 110-1, store (in a second entry) the signal strength information for second Wi-Fi device 110-2, and so on.

As an example, the signal strength information for first Wi-Fi device 110-1 may include the information identifying first Wi-Fi device 110-1, a signal strength of signals received from first Wi-Fi device 110-1, a frequency of the signals received from first Wi-Fi device 110-1, information identifying a frequency band (or a channel) of the signals received by WAP 105, and/or information identifying a time or a period of time during which the signal strengths were measured, among other examples.

The signal strength of signals may include a minimum signal strength measured during the particular period of time, a maximum signal strength measured during the particular period of time, a median signal strength measured during the particular period of time, and/or an average signal strength measured during the particular period of time. In some situations, management system 115 may determine the median signal strength and/or the average signal strength.

As shown in FIG. 1B, and by reference number 135, management system 115 may obtain attenuation information regarding an attenuation value for a geographic address associated with the WAP. For example, management system 115 may obtain the attenuation information using the geographic address associated with WAP 105. The geographical address may be a geographic address of the customer premises.

Management system 115 may obtain the attenuation information from attenuation value data store 125. In some instances, the attenuation information may include a first attenuation value associated with a first frequency band, a second attenuation value associated with a second frequency band, and so on.

In some situations, attenuation value data store 125 may not store the attenuation information associated with the geographic address associated with WAP 105. In such situations, management system 115 may use one or more default attenuation values associated with one or more frequency bands. In some implementations, the one or more default attenuation values may be determined by the service provider. As an example, a default value may be 6 dB. Due to standard building codes in a country and/or a region associated with WAP 105, a standard estimated attenuation value for each frequency can be used in the event no actual measurement is available.

In some examples, one or more default attenuation values may be based on a material of the obstructing structure, a thickness of the obstructing structure, and a frequency of the signal. For example, an attenuation value for reinforced concrete (203 mm) may be between 31 dB and 63 dB depending on the frequency of the signal. An attenuation value for concrete (203 mm) may be between 29 dB and 54 dB depending on the frequency of the signal. An attenuation value for brick-faced concrete may be between 18 dB and 48 dB depending on the frequency of the signal. An attenuation value for masonry block may be between 11 dB and 16 dB depending on the frequency of the signal. An attenuation value for lumber (dry—38 mm) may be between 3 dB and 4 dB depending on the frequency of the signal. An attenuation value for drywall may be approximately 1 dB. An attenuation value for plywood (6 mm) may be approximately 1 dB.

As shown in FIG. 1C, and by reference number 140, management system 115 may determine whether a median value of a signal strength of a first Wi-Fi device satisfies a signal strength threshold. For example, after receiving the signal strength information, management system 115 may identify Wi-Fi devices that are located outside of the building. When determining whether WAP 105 has been relocated, management system 115 may discard the signal strengths of signals from the Wi-Fi devices that are located outside of the building. Management system 115 may discard the signal strengths because the signal strengths may not be strong enough and/or may not be constant enough to be used to determine whether WAP 105 has been relocated.

As part of determining whether a Wi-Fi device is located outside of the building, management system 115 may determine whether a median value (and/or an average value) of a signal strength of signals received from the Wi-Fi device satisfies the signal strength threshold. In some situations, management system 115 may determine that first Wi-Fi device 110-1 is located outside of the building based on determining that a median value (and/or an average value) of a signal strength of signals received from first Wi-Fi device 110-1 does not satisfy the signal strength threshold.

In some examples, the signal strength threshold may be determined by a personnel of the service provider associated with WAP 105. In some examples, the signal strength threshold may be determined based on historical data regarding signal strengths associated with Wi-Fi devices connected to WAP 105.

As shown in FIG. 1C, and by reference number 145, management system 115 may determine whether a difference between a maximum value and a minimum value of the signal strength of the first Wi-Fi device exceeds a particular value that is based on the attenuation value and the quantity of obstructing structures. In some situations, if management system 115 determines that the signal strength (of the signals received from first Wi-Fi device 110-1) satisfies the signal strength threshold, management system 115 may determine a difference between a maximum value and a minimum value of the signal strength of first Wi-Fi device 110-1. Management system 115 may determine whether the difference exceeds the particular value. In some implementations, management system 115 may determine whether the difference exceeds the particular value in order to determine a measure of disparity with respect to the signal strength of the signals received from first Wi-Fi device 110-1. The measure of disparity may indicate whether the signal strength is constant. A constant signal strength may be used to determine whether WAP 105 has been relocated.

In some implementations, the particular value may be a mathematical combination of the attenuation value and the quantity of obstructing structures. For example, the particular value may be obtained by multiplying the attenuation and the quantity of obstructing structures. Alternatively, the particular value may be obtained by one or more mathematical combinations of the attenuation and the quantity of obstructing structures.

As shown in FIG. 1C, and by reference number 150, management system 115 may determine whether the first Wi-Fi device is located inside of the building or located outside of the building. For example, management system 115 may determine that first Wi-Fi device 110-1 is located outside of the building based on determining that the difference exceeds the particular value. Alternatively, management system 115 may determine that first Wi-Fi device 110-1 is located inside of the building based on determining that the difference does not exceed the particular value (e.g., the difference less than or equal to the particular value).

In some instances, management system 115 may update signal strength data store 120 to indicate that first Wi-Fi device 110-1 is located outside of the building. Alternatively, management system 115 may update signal strength data store 120 to indicate that first Wi-Fi device 110-1 is located inside of the building.

As shown in FIG. 1D, and by reference number 155, management system 115 may determine that the first Wi-Fi device is not stationary based on determining that the first Wi-Fi device is located outside of the building. In some instances, management system 115 may identify an entry, in signal strength data store 120, that includes information indicating that a Wi-Fi device is located outside of the building. Management system 115 may update signal strength data store 120 to indicate that first Wi-Fi device 110-1 is not stationary. Additionally, or alternatively, management system 115 may update signal strength data store 120 to indicate that first Wi-Fi device 110-1 is located outside of the building.

As shown in FIG. 1D, and by reference number 160, management system 115 may determine whether a difference between a maximum value and a minimum value of a signal strength of a second Wi-Fi device exceeds the attenuation value (based on the second Wi-Fi device being located inside of the building). In some implementations, management system 115 may identify Wi-Fi devices that are located inside of the building. For example, management system 115 may identify Wi-Fi devices that are located inside of the building based on analyzing the signal strength information.

As part of determining whether a Wi-Fi device is located inside of the building, management system 115 may determine whether a median value (and/or an average value) of a signal strength of signals received from the Wi-Fi device satisfies the signal strength threshold. In some situations, management system 115 may determine that second Wi-Fi device 110-2 is located inside of the building based on determining that a median value (and/or an average value) of a signal strength of signals received from second Wi-Fi device 110-2 satisfies the signal strength threshold. In some instances, management system 115 may update signal strength data store 120 to indicate that second Wi-Fi device 110-2 is located inside of the building.

After determining that second Wi-Fi device 110-2 is located inside of the building, management system 115 may determine whether second Wi-Fi device 110-2 is stationary. In this regard, management system 115 may identify an entry, in signal strength data store 120, that identifies a Wi-Fi device located inside of the building. As an example, management system 115 may identify an entry for second Wi-Fi device 110-2.

Management system 115 may determine a difference between a maximum value and a minimum value of a signal strength of signal signals received from second Wi-Fi device 110-2. Management system 115 may determine whether the difference exceeds the attenuation value. Management system 115 may determine whether second Wi-Fi device 110-2 is stationary based on determining whether the difference exceed the attenuation value.

As shown in FIG. 1D, and by reference number 165, management system 115 may determine whether the second Wi-Fi device is stationary. For example, management system 115 may determining that second Wi-Fi device 110-2 is stationary based on determining that the difference does not exceed the attenuation value (e.g., the difference is less than or equal to the attenuation value).

As shown in FIG. 1D, and by reference number 170, management system 115 may store the signal strength information. For example, management system 115 may update signal strength data store 120 as described herein.

Figure 1E:
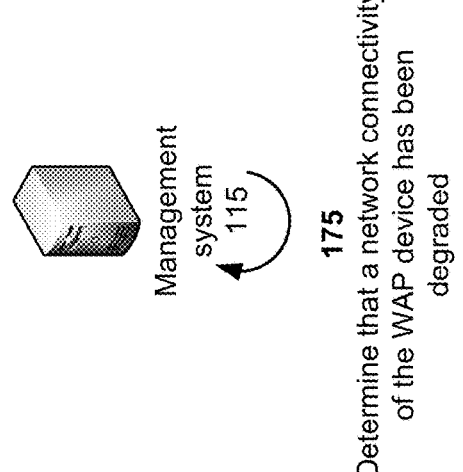
Figure 1E:
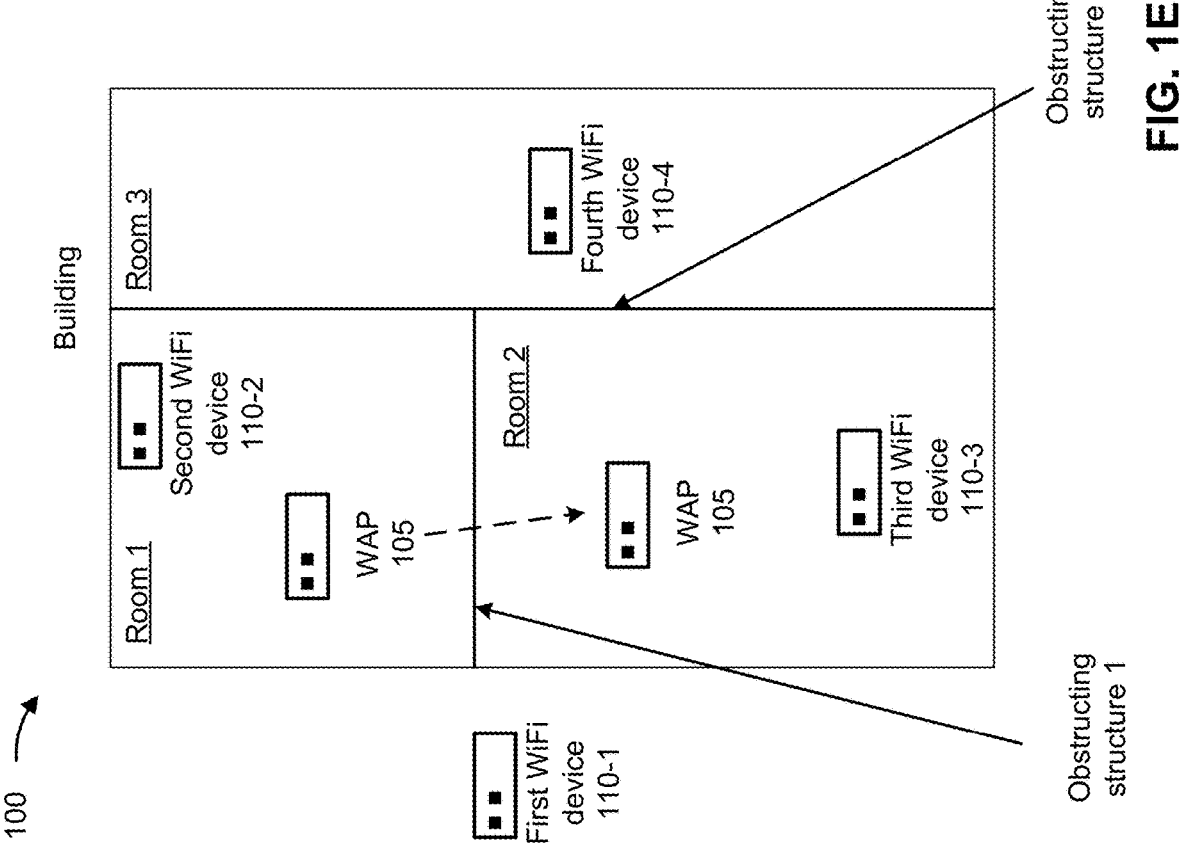

As shown in FIG. 1E, and by reference number 175, management system 115 may determine that a network connectivity of the WAP has been degraded. For example, management system 115 may receive a notification that the performance of WAP 105 has been degraded. In some implementations, the notification may include information identifying WAP 105, information identifying the address associated with WAP 105, information indicating delays associated with transmitting and/or receiving information via WAP 105, among other examples.

Management system 115 may receive the notification from a device of a user associated with WAP 105 and/or a device of the personnel of the service provider associated with WAP 105, among other examples. In some examples, management system 115 may receive the notification from the device of the personnel during a troubleshooting operation regarding a connection established by WAP 105.

As shown in FIG. 1E, WAP 105 may be relocated from a first location to a second location. For example, WAP 105 may be relocated from the first room of the building to the second location of the building. The first room and the second room may be separated by a first obstructing structure (e.g., obstructing structure 1 which may be a first wall). The first room and the third room may be separated by a second obstructing structure (e.g., obstructing structure 2 which may be a second wall). Similarly, the second room and the third room may be separated by the second obstructing structure.

As a result of WAP 105 being relocated from the first room to the second room, a signal strength of the signals received by WAP 105 from second Wi-Fi device 110-2 may be decreased by the first obstructing structure. Conversely, a signal strength of the signals received by WAP 105 from third Wi-Fi device 110-3 may be increased because the signals are no longer obstructed by the first obstructing structure. Additionally, a signal strength of the signals received by WAP 105 from fourth Wi-Fi device 110-4 may not change significantly because the signals remain obstructed by the second obstructing structure.

As a result of WAP 105 being relocated from the first room to the second room, the performance of WAP 105 may be degraded. For example, the signals transmitted to and received from first Wi-Fi device 110-1 may be degraded because the signal strength (of the signals received from first Wi-Fi device 110-1) has been decreased due to the signals being obstructed by the first obstructing structure.

Figure 1F:
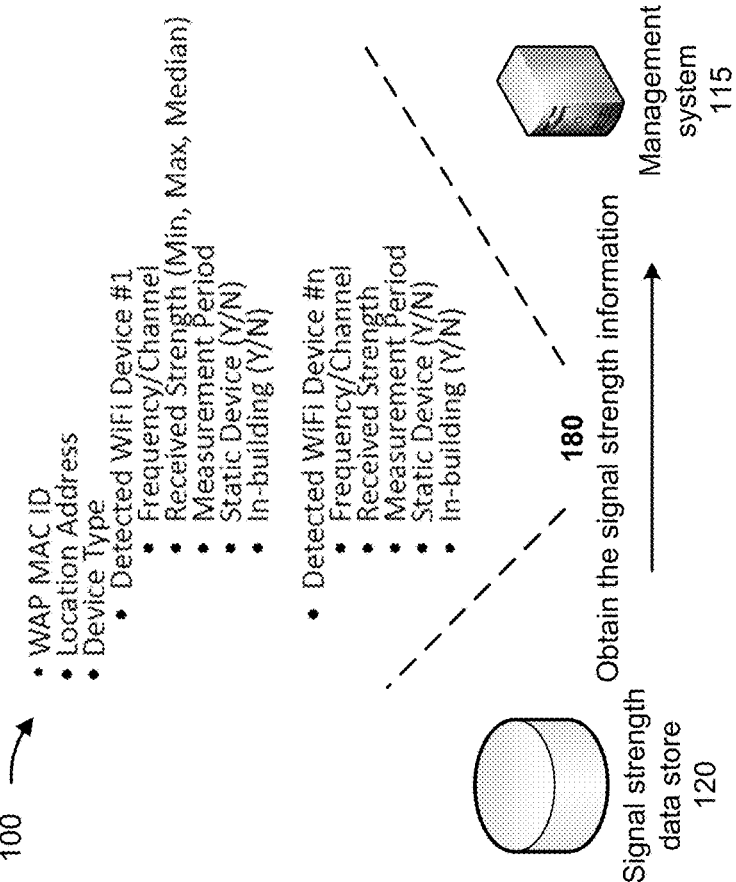

As shown in FIG. 1F, and by reference number 180, management system 115 may obtain the signal strength information. For example, based on receiving the notification, management system 115 obtain the signal strength information from signal strength data store 120. In some implementations, management system 115 obtain use the information identifying WAP 105 to obtain the signal strength information for multiple periods of time (e.g., a current period of time and a prior period of time preceding the current period).

For example, using the information identifying WAP 105, management system 115 may obtain a first signal strength (of signals received from first Wi-Fi device 110-1) for the current period of time and for the prior period of time, a second signal strength (of signals received from first Wi-Fi device 110-1) for the current period of time and for the prior period of time, and so on. In some examples, the first signal strength may refer to a median signal strength of signals received from first Wi-Fi device 110-1. Additionally, or alternatively, the first signal strength may refer to an average signal strength of signals received from first Wi-Fi device 110-1.

In some examples, the second signal strength may refer to a median signal strength of signals received from second Wi-Fi device 110-2. Alternatively, the second signal strength may refer to an average signal strength of signals received from second Wi-Fi device 110-2.

As shown in FIG. 1G, and by reference number 185, management system 115 may compare signal strengths, of two or more Wi-Fi devices that are stationary, for a current period of time and a prior period of time. For example, based on the signal strength information, management system 115 may determine that WAP 105 is receiving signals from two or more Wi-Fi devices.

In some implementations, management system 115 may compare the first signal strength for the current period of time and the first signal strength for the prior period of time to determine a change in the first signal strength from the prior period of time to the current period of time. Management system 115 may compare the first signal strength for the current period of time and the first signal strength for the prior period of time based on determining that WAP 105 is receiving signals from the two or more base stations.

Additionally, management system 115 may compare the second signal strength for the current period of time and the second signal strength for the prior period of time to determine a change in the second signal strength from the prior period of time to the current period of time. Management system 115 may compare the second signal strength for the current period of time and the second signal strength for the prior period of time based on determining that WAP 105 is receiving signals from the two or more base stations.

As shown in FIG. 1G, and by reference number 190, management system 115 may determine whether the signal strength of the second Wi-Fi device has been increased by at least the attenuation value and whether the signal strength of the third Wi-Fi device has been decreased by at least the attenuation value. For example, based on comparing the first signal strength (associated with second Wi-Fi device 110-2) for the current period of time and the first signal strength for the prior period of time, management system 115 may determine whether the first signal strength has increased by a value that is equal to or exceeds the attenuation value. Alternatively, management system 115 may determine whether the first signal strength has decreased by a value that is equal to or exceeds the attenuation value.

Based on comparing the second signal strength (associated with third Wi-Fi device 110-3) for the current period of time and the second signal strength for the prior period of time, management system 115 may determine whether the second signal strength has decreased by a value that corresponds to or exceeds the attenuation value. Alternatively, management system 115 may determine whether the second signal strength has increased by a value that corresponds to or exceeds the second attenuation value.

As shown in FIG. 1G, and by reference number 195, management system 115 may determine that the WAP has been relocated. For example, management system 115 may determine that WAP 105 has been relocated based on determining that the first signal strength has decreased by a value that is equal to or exceeds the attenuation value and that the second signal strength has increased by a value that is equal to or exceeds the attenuation value. Referring back to the example relocation described in connection with FIG. 1E, as a result of WAP 105 being relocated from the first room to the second room, the first signal strength (of signals received by WAP 105 from first Wi-Fi device 110-1) may be decreased by the obstructing structure.

Accordingly, the first signal strength may be decreased by a value that is equal to or exceeds the first attenuation value. Conversely, a signal strength of signals received by WAP 105 from second Wi-Fi device 110-2 may be increased because the signals are no longer obstructed by the obstructing structure. Accordingly, the second signal strength may be increased by a value that is equal to or exceeds the second attenuation value.

In some examples, management system 115 may determine that WAP 105 has been relocated based on determining that the first signal strength has increased by a value that is equal to or exceeds the first attenuation value and that the second signal strength has decreased by a value that is equal to or exceeds the second attenuation value.

Management system 115 may provide information indicating that WAP 105 has been relocated. For example, management system 115 provide the information to the device of the user associated with WAP 105 and/or to the device of the personnel of the service provider associated with WAP 105. In some implementations, the information may include an instruction to relocate WAP 105 to a previous location of WAP 105 (e.g., a location prior to the performance being degraded). In the examples described herein, the previous location may be the first room or the first external side.

Figure 1H:
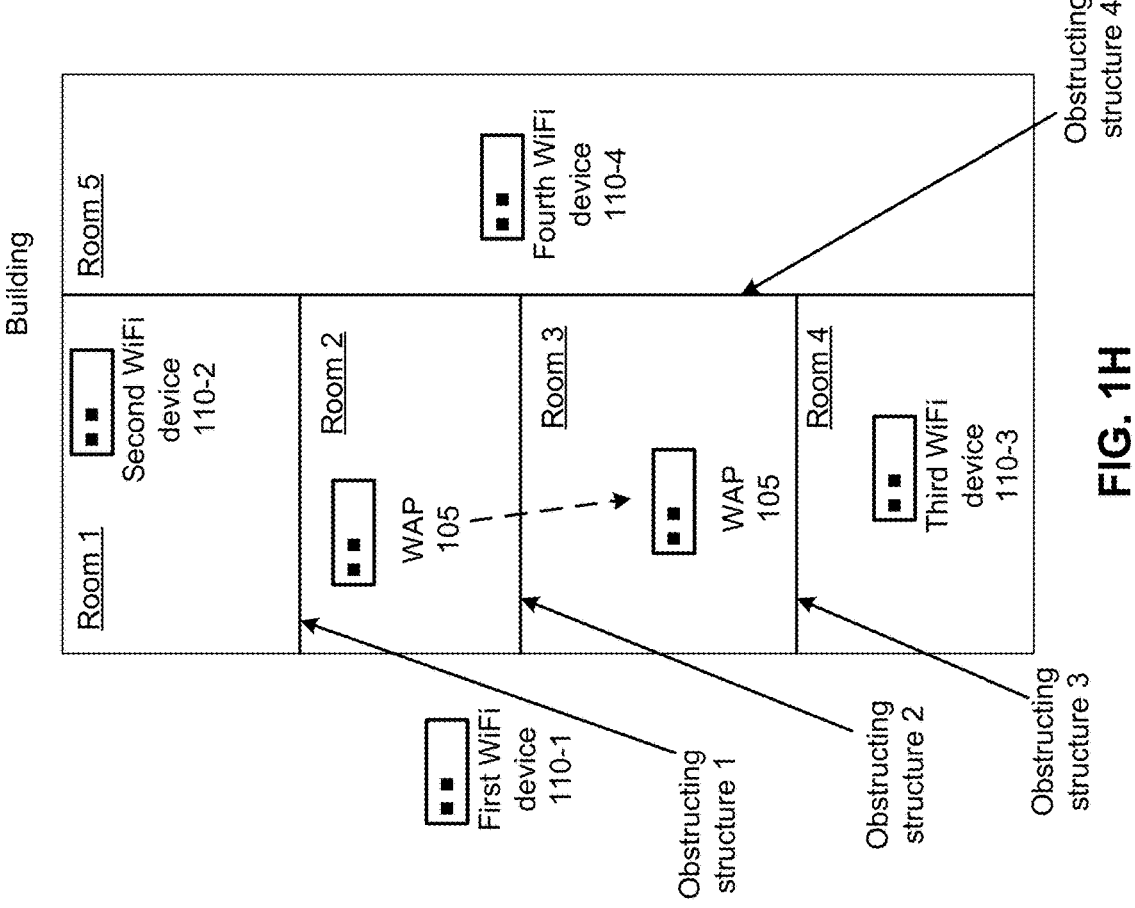

As shown in FIG. 1H, first Wi-Fi device 110-1 may be located outside of the building while second Wi-Fi device 110-2, third Wi-Fi device 110-3, and fourth Wi-Fi device 110-4 may be located inside of the building. The building may include five rooms. For example, second Wi-Fi device 110-2 may be located in the first room of the building, third Wi-Fi device 110-3 may be located in a fourth room of the building, and fourth Wi-Fi device 110-4 may be located in a fifth room of the building. WAP 105 may be located in a second room of the building.

The first room and the second room may be separated by a first obstructing structure (e.g., obstructing structure 1 which may be a first wall). The second room and the third room may be separated by a second obstructing structure (e.g., obstructing structure 2 which may be a second wall). The third room and the fourth room may be separated by a third obstructing structure (e.g., obstructing structure 3 which may be a third wall). A fourth obstructing structure (e.g., obstructing structure 4 which may be a fourth wall) may separate the fifth room from the second room, the third room, and the fourth room.

As shown in FIG. 1H, WAP 105 may be relocated from the second room to third room. As a result of WAP 105 being relocated from the second room to the third room, a signal strength of the signals received by WAP 105 from second Wi-Fi device 110-2 may be decreased by the second obstructing structure in addition to being previously decreased by the first obstructing structure. Conversely, a signal strength of the signals received by WAP 105 from third Wi-Fi device 110-3 may be increased because the signals are no longer obstructed by the second obstructing structure. Additionally, a signal strength of the signals received by WAP 105 from fourth Wi-Fi device 110-4 may not change significantly because the signals remain obstructed by the fourth obstructing structure.

Management system 115 may determine that the signal strength (of the signals received by WAP 105 from second Wi-Fi device 110-2) has been decreased by an attenuation value associated with the second obstructing structure. Additionally, management system 115 may determine that the signal strength (of the signals received by WAP 105 from third Wi-Fi device 110-3) has been increased by an attenuation value associated with the third obstructing structure. Accordingly, management system 115 may determine that WAP 105 has been relocated (e.g., from the second room to the third room).

By determining that WAP 105 being relocated is a cause of the degraded performance of WAP 105, management system 115 may prevent time-consuming troubleshooting, as described above. Accordingly, by determining that WAP 105 being relocated is the cause of the degraded performance, management system 115 may prevent WAP 105 from rebooting and/or performing the re-configuration, as described above. Therefore, implementations described herein preserve network resources and/or computing resources that would have been consumed by troubleshooting the connection, as described above.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1G may be implemented as multiple, distributed devices.

Additionally, or alternatively, a set of devices (e.g., one or more devices) shown in FIGS. 1A-1G may perform one or more functions described as being performed by another set of devices shown in FIGS. 1A-1G.

Figure 2:
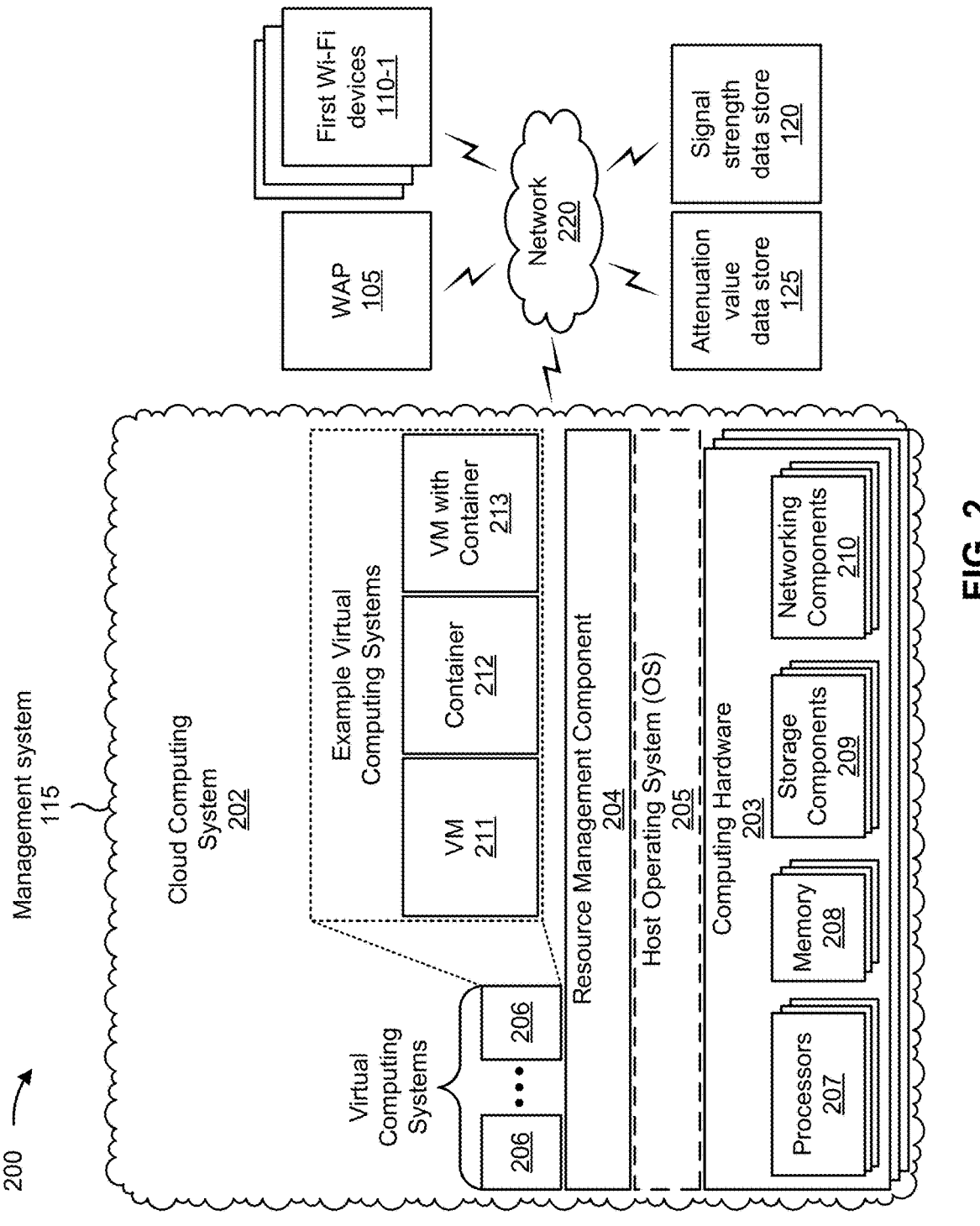
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include management system 115, which may include one or more elements of and/or may execute within a cloud computing system 202. The cloud computing system 202 may include one or more elements 203-213, as described in more detail below. As further shown in FIG. 2, environment 200 may include WAP 105, first Wi-Fi device 110-1 and one or more additional Wi-Fi devices 110, signal strength data store 120, attenuation value data store 125, and/or network 220. WAP 105, Wi-Fi devices 110, signal strength data store 120, and attenuation value data store 125 have been described above in connection with FIG. 1. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although management system 115 may include one or more elements 203-213 of the cloud computing system 202, may execute within the cloud computing system 202, and/or may be hosted within the cloud computing system 202, in some implementations, management system 115 may not be cloud-based (e.g., may be implemented outside of a cloud computing system) or may be partially cloud-based. For example, management system 115 may include one or more devices that are not part of the cloud computing system 202, such as device 300 of FIG. 3, which may include a standalone server or another type of computing device. Management system 115 may perform one or more operations and/or processes described in more detail elsewhere herein.

While the foregoing has been described with to management system 115 being implemented as part of a cloud computing environment, in some implementations may be management system 115 implemented separate from a cloud computing environment. For example, management system 115 may be a server device. For instance, the server device may include a server, such as an application server, a client server, a web server, a database server, a host server, a proxy server, and/or a virtual server (e.g., executing on computing hardware).

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
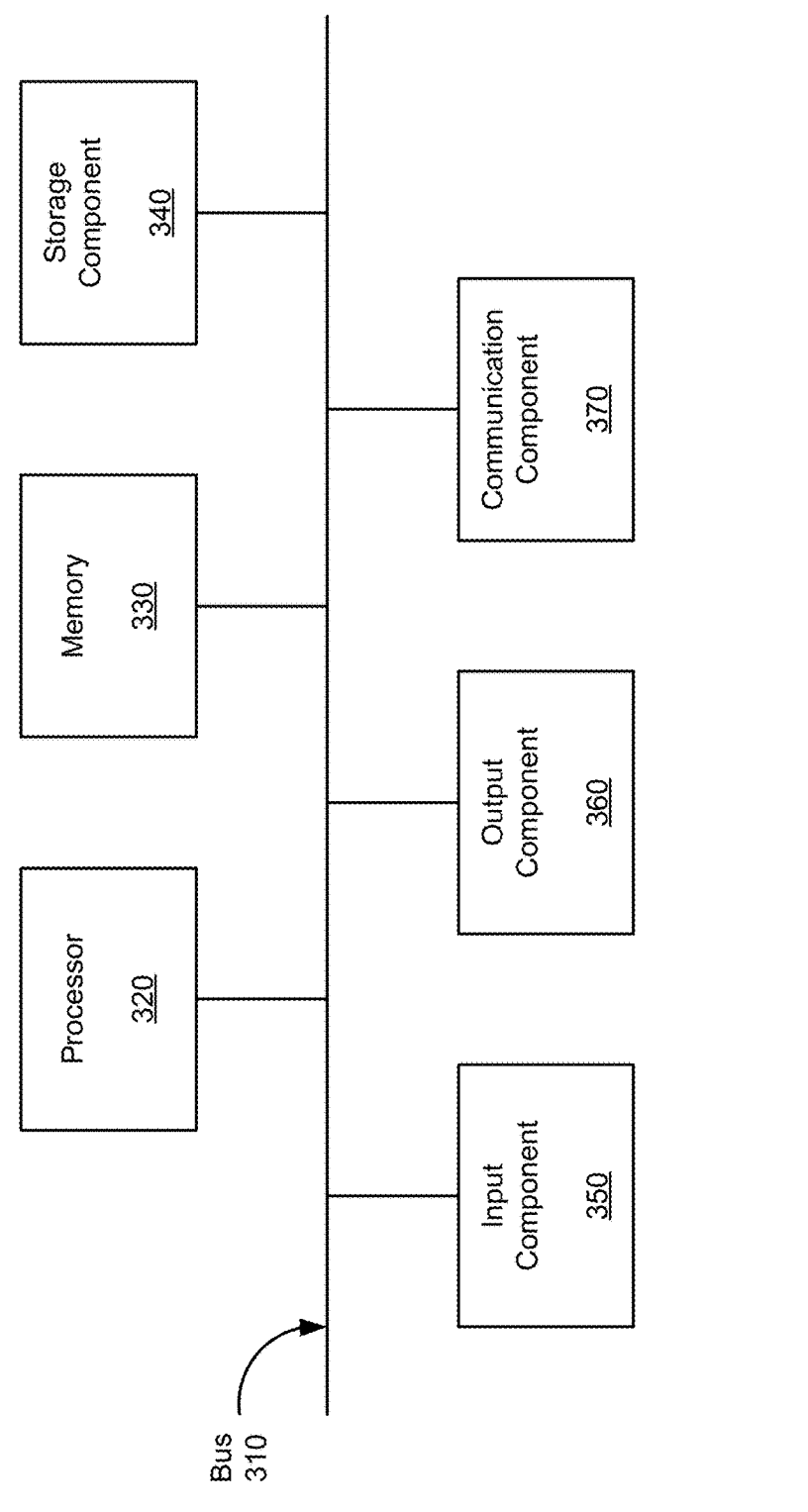
FIG. 3 is a diagram of example components of one or more devices of FIG. 2.

FIG. 3 is a diagram of example components of a device 300, which may correspond to WAP 105, Wi-Fi devices 110, and/or management system 115. In some implementations, WAP 105, Wi-Fi devices 110, and/or management system 115 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with systems and methods for detecting the relocation of a wireless access point. In some implementations, one or more process blocks of FIG. 4 may be performed by a management system (e.g., management system 115). In some implementations, one or more process blocks of FIG. 4 may be performed by another device or a group of devices separate from or including the management system, such as Wi-Fi devices (e.g., Wi-Fi devices 110). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include analyzing signal strengths of signals received by a first device (block 410). For example, the management system may analyze signal strengths of signals received by a first device, as described above. In some implementations, the signals are received from a plurality of devices. In some implementations, the first device is located in a first location of an enclosed structure. In some implementations, the first device includes a wireless access point, and the plurality of devices include Wi-Fi devices.

As further shown in FIG. 4, process 400 may include determining, based on analyzing the signal strengths, that a first subset of devices, of the plurality of devices, are located outside of the enclosed structure (block 420). For example, the management system may determine, based on analyzing the signal strengths, that a first subset of devices, of the plurality of devices, are located outside of the enclosed structure, as described above.

As further shown in FIG. 4, process 400 may include determining, based on analyzing the signal strengths, that a second subset of devices, of the plurality of devices, are located inside of the enclosed structure (block 430). For example, the management system may determine, based on analyzing the signal strengths, that a second subset of devices, of the plurality of devices, are located inside of the enclosed structure, as described above. The second subset of devices may include one or more devices that are stationary and one or more devices that are not stationary.

As further shown in FIG. 4, process 400 may include determining whether signals are being received from devices, of the second subset of devices, that are stationary (block 430). For example, the management system may determine, based on analyzing the signal strengths, whether signals are being received from devices, of the second subset of devices, that are stationary, as described above. The second subset of devices may include a second device and a third device. The signal strengths may include a first signal strength of the second device and a second signal strength of the third device. Based on analyzing the first signal strength and the second signal strength, the management system may determine that the second device and the third device are stationary.

As further shown in FIG. 4, process 400 may include determining that the first signal strength has increased by an attenuation value and that the second signal strength has decreased by the attenuation value (block 450). For example, the management system may determine that the first signal strength has increased by an attenuation value and that the second signal strength has decreased by the attenuation value, as described above.

As further shown in FIG. 4, process 400 may include determining that the first device has been relocated from the first location to a second location of the enclosed structure based on the first signal strength increasing by the attenuation value and the second signal strength decreasing by the attenuation value (block 460). For example, the management system may determine that the first device has been relocated from the first location to a second location of the enclosed structure based on the first signal strength increasing by the attenuation value and the second signal strength decreasing by the attenuation value, as described above.

In some implementations, the second subset of devices further include a fourth device and the signal strengths further include a third signal strength of the fourth device. In some implementations, process 400 comprises determining, based on the first signal strength, that the second device is stationary, determining, based on the second signal strength, that the third device is stationary, determining, based on the third signal strength, that the fourth device is not stationary, and determining to use the first signal strength and the second signal strength based on determining that the second device is stationary and that the third device is stationary.

In some implementations, determining that the second device is stationary comprises determining a difference between a maximum value of the first signal strength and a minimum value of the first signal strength, determining that the difference does not exceed the attenuation value, and determining that the second device is stationary based on determining that the difference does not exceed the attenuation value.

In some implementations, determining that the fourth device is not stationary comprises determining a difference between a maximum value of the third signal strength and a minimum value of the third signal strength, determining that the difference exceeds the attenuation value, and determining that the fourth device is not stationary based on determining that the difference exceeds the attenuation value.

In some implementations, process 400 includes determining that a median value, of the first signal strength, satisfies a signal strength threshold, and determining that the second device is located inside of the enclosed structure based on determining that the median value satisfies the signal strength threshold.

In some implementations, the first subset of devices include a fourth device and the signal strengths further include a third signal strength of the fourth device. In some implementations, process 400 comprises determining whether a median value, of the third signal strength, satisfies a signal strength threshold, and determining that the fourth device is located outside of the enclosed structure based on determining whether the median value satisfies the signal strength threshold.

In some implementations, determining that the fourth device is located outside of the enclosed structure comprises determining that the median value satisfies the signal strength threshold, determining a difference between a maximum value of the third signal strength and a minimum value of the third signal strength based on determining that the median value satisfies the signal strength threshold, determining that the difference exceeds a particular value that is based on the attenuation value and a quantity of obstructing structures, and determining that the third device is located outside of the enclosed structure based on determining that the difference exceeds the particular value.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by a management system, the method comprising:

receiving a notification that network connectivity, of a first device, has been degraded;

analyzing signal strengths of signals received by the first device based on receiving the notification, wherein the signals are received from a plurality of devices, and wherein the first device is located in a first location of an enclosed structure;

determining, based on analyzing the signal strengths, that a first subset of devices, of the plurality of devices, are located outside of the enclosed structure;

determining, based on analyzing the signal strengths, that a second subset of devices, of the plurality of devices, are located inside of the enclosed structure, wherein the second subset of devices include a second device and a third device that are stationary, and wherein the signal strengths include a first signal strength of the second device and a second signal strength of the third device;

determining that the first signal strength has increased by an attenuation value and that the second signal strength has decreased by the attenuation value; and determining that the first device has been relocated from the first location to a second location of the enclosed structure based on the first signal strength increasing by the attenuation value and the second signal strength decreasing by the attenuation value.

2. The method of claim 1, wherein the second subset of devices further include a fourth device, wherein the signal strengths further include a third signal strength of the fourth device, and wherein the method further comprises:

determining, based on the first signal strength, that the second device is stationary;

determining, based on the second signal strength, that the third device is stationary;

determining, based on the third signal strength, that the fourth device is not stationary; and determining to use the first signal strength and the second signal strength based on determining that the second device is stationary and that the third device is stationary.

3. The method of claim 2, wherein determining that the second device is stationary comprises:

determining a difference between a maximum value of the first signal strength and a minimum value of the first signal strength;

determining that the difference does not exceed the attenuation value; and determining that the second device is stationary based on determining that the difference does not exceed the attenuation value.

4. The method of claim 2, wherein determining that the fourth device is not stationary comprises:

determining a difference between a maximum value of the third signal strength and a minimum value of the third signal strength;

determining that the difference exceeds the attenuation value; and determining that the fourth device is not stationary based on determining that the difference exceeds the attenuation value.

5. The method of claim 1, further comprising:

determining that a median value, of the first signal strength, satisfies a signal strength threshold; and determining that the second device is located inside of the enclosed structure based on determining that the median value satisfies the signal strength threshold.

6. The method of claim 1, wherein the first subset of devices include a fourth device, wherein the signal strengths further include a third signal strength of the fourth device, and wherein the method further comprises:

determining whether a median value, of the third signal strength, satisfies a signal strength threshold; and determining that the fourth device is located outside of the enclosed structure based on determining whether the median value satisfies the signal strength threshold.

7. The method of claim 6, wherein determining that the fourth device is located outside of the enclosed structure comprises:

determining that the median value satisfies the signal strength threshold;

determining a difference between a maximum value of the third signal strength and a minimum value of the third signal strength based on determining that the median value satisfies the signal strength threshold;

determining that the difference exceeds a particular value that is based on the attenuation value and a quantity of obstructing structures; and determining that the third device is located outside of the enclosed structure based on determining that the difference exceeds the particular value.

8. The method of claim 1, wherein the first device includes a wireless access point, and wherein the plurality of devices include Wi-Fi devices.

9. A device, comprising:

one or more processors configured to:

receive a notification that network connectivity, of a first device, has been degraded;

analyze signal strengths of signals received by the first device based on receiving the notification, wherein the signals are received from a plurality of Wi-Fi devices, and wherein the first device is located in a first location of a structure;

determine, based on analyzing the signal strengths, that a subset of Wi-Fi devices, of the plurality of Wi-Fi devices, are located inside of the structure, wherein the subset of Wi-Fi devices include a first Wi-Fi device and a second Wi-Fi device, and wherein the signal strengths include a first signal strength of the first Wi-Fi device and a second signal strength of the second Wi-Fi device;

determine that the first signal strength has increased by an attenuation value and that the second signal strength has decreased by the attenuation value; and determine that the first device has been relocated from the first location to a second location of the structure.

10. The device of claim 9, wherein the one or more processors are configured to:

provide first information indicating that the network connectivity, of the first device, has been degraded because the first device has been relocated from the first location to the second location; and provide second information indicating that the first device is to be relocated from the second location to the first location.

11. The device of claim 9, wherein the one or more processors are configured to:

determine, based on the first signal strength and the second signal strength, that the first Wi-Fi device and the second Wi-Fi device are stationary; and determine that the first signal strength and the second signal strength are to be used to determine whether the first device has been relocated, wherein the first signal strength and the second signal strength are to be used based on determining that the first Wi-Fi device and the second Wi-Fi device are stationary.

12. The device of claim 9, wherein the subset of Wi-Fi devices include a third Wi-Fi device, wherein the signal strengths further include a third signal strength of the third Wi-Fi device, and wherein the one or more processors are configured to:

determine, based on the third signal strength, that the third Wi-Fi device is not a stationary device; and determine that the third signal strength is not to be used to determine whether the first device has been relocated from the first location to the second location, wherein the third signal strength is not to be used based on determining that the third Wi-Fi device is not a stationary device.

13. The device of claim 9, wherein an obstructing structure separates the first location from the second location, wherein the attenuation value is based on the obstructing structure, and wherein the one or more processors are configured to:

obtain, from a data store, the attenuation value, wherein the attenuation value is obtained using information identifying a geographic address associated with the structure.

14. The device of claim 9, wherein the first device includes a wireless access point.

15. A non-transitory computer-readable medium storing a set of instructions, the set of instructions comprising:

one or more instructions that, when executed by one or more processors of a device, cause the device to:

receive a notification that network connectivity, of a first device, has been degraded;

analyze signal strengths of signals received by the first device based on receiving the notification, wherein the signals are received from a plurality of devices, and wherein the first device is located in a first location of a structure;

identify a subset of devices, of the plurality of devices, located inside of the structure, wherein the subset of devices are identified based on analyzing the signal strengths;

identify a second device and a third device, of the subset of devices, that are stationary, wherein the second device and the third device are identified based on analyzing the signal strengths, and wherein the signal strengths include a first signal strength of the second device and a second signal strength of the third device;

determine that the first signal strength has increased by an attenuation value and that the second signal strength has decreased by the attenuation value; and determine that the first device has been relocated from the first location to a second location of the structure based on the first signal strength increasing by the attenuation value and the second signal strength decreasing by the attenuation value.

16. The non-transitory computer-readable medium of claim 15, wherein the first device, the second device, and the third device are Wi-Fi devices.

17. The non-transitory computer-readable medium of claim 15, wherein the one or more instructions, when executed by the one or more processors, further cause the device to:

determine a median value of the first signal strength or an average value of the first signal strength;

determine that the median value or the average value satisfies a signal strength threshold; and determine that the second device is located inside of the structure based on determining that the median value or the average value satisfies the signal strength threshold.

18. The non-transitory computer-readable medium of claim 17, wherein the one or more instructions, when executed by the one or more processors, further cause the device to:

determine a difference between a maximum value of the first signal strength and a minimum value of the first signal strength after determining that the median value or the average value satisfies the signal strength threshold;

determine that the difference does not exceed a particular value that is based on the attenuation value and a quantity of obstructing structures; and determine that the second device is located inside of the structure based on determining that the difference does not exceed the particular value.

19. The non-transitory computer-readable medium of claim 18, wherein the one or more instructions, when executed by the one or more processors, further cause the device to:

determine that the difference does not exceed the attenuation value; and determine that the second device is stationary based on determining that the difference does not exceed the attenuation value.

20. The non-transitory computer-readable medium of claim 15, wherein the one or more instructions, when executed by the one or more processors, further cause the device to:

provide information indicating that the network connectivity, of the first device, has been degraded because the first device has been relocated from the first location to the second location; and provide information indicating that the first device is to be relocated from the second location to the first location.

\*   \*   \*   \*   \*